United States Patent [19]

Helmer-Metzmann et al.

[11] Patent Number: 5,362,836
[45] Date of Patent: Nov. 8, 1994

[54] POLYMER ELECTROLYTES AND THEIR PREPARATION

[75] Inventors: Freddy Helmer-Metzmann, Mainz; Frank Osan, Kelkheim, both of Germany

[73] Assignee: Hoechst Aktiengesellschaft, Frankfurt am Main, Germany

[21] Appl. No.: 73,878

[22] Filed: Jun. 9, 1993

[30] Foreign Application Priority Data

Jun. 11, 1992 [DE] Germany .................. 4219077

[51] Int. Cl.$^5$ .............. C08G 8/02; C08G 14/00; C08G 65/00; C08G 67/00
[52] U.S. Cl. .................. 528/125; 528/126; 528/174; 528/175; 528/219; 528/220; 525/328.5; 525/535
[58] Field of Search .............. 528/126, 126, 174, 175, 528/220, 219; 525/328.5, 535

[56] References Cited

U.S. PATENT DOCUMENTS

| | | | |
|---|---|---|---|
| 2,861,116 | 11/1958 | Grubb et al. | |
| 3,065,205 | 11/1962 | Bonner, Jr. | 528/125 |
| 3,441,538 | 4/1969 | Marks | 528/125 |
| 4,108,837 | 8/1978 | Johnson et al. | 528/126 |
| 4,942,216 | 7/1990 | Heinz et al. | 528/125 |
| 4,997,902 | 3/1991 | Koch et al. | 528/125 |
| 5,118,766 | 6/1992 | Hendy et al. | 528/125 |
| 5,166,305 | 11/1992 | Park et al. | 528/125 |

FOREIGN PATENT DOCUMENTS

| | | |
|---|---|---|
| 0008895 | 3/1980 | European Pat. Off. |
| 0041780 | 12/1981 | European Pat. Off. |
| 0047903A1 | 3/1982 | European Pat. Off. |
| 0382440A1 | 8/1990 | European Pat. Off. |
| 971227 | 9/1964 | United Kingdom . |
| 1387303 | 3/1973 | United Kingdom . |
| 03891 | 10/1984 | WIPO . |

OTHER PUBLICATIONS

Patent Abstracts of Japan, vol. 14, No. 288, Jun. 21, 1990.

*Primary Examiner*—John Kight, III
*Assistant Examiner*—P. Hampton-Hightower
*Attorney, Agent, or Firm*—Curtis, Morris & Safford

[57] ABSTRACT

Polymer electrolytes are described that comprise a sulfonated aromatic polyether ketone, e.g. of the formula II

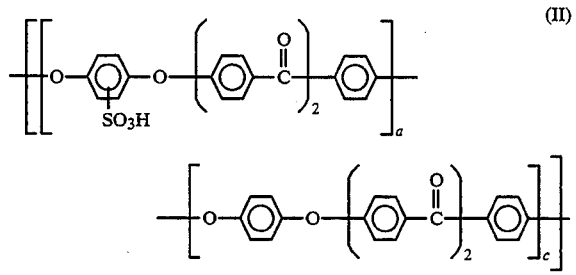

where
A is from 0.2 to 1,
c is from 0 to 0.8, and
a+c=1.

The polymer electrolytes are prepared by dissolving an aromatic polyether ketone in 94–97% by weight sulfuric acid and adding a sulfonating agent, e.g. oleum, to the solution until the sulfuric acid concentration is from 98 to 99.9% by weight.

19 Claims, No Drawings

POLYMER ELECTROLYTES AND THEIR PREPARATION

The present invention relates to polymer electrolytes comprising a sulfonated aromatic polyether ketone and to processes for preparing these polymer electrolytes.

Sulfonated polyether ketones form cation ion exchangers. They are useful as membrane materials, for example for ultrafiltration, for desalting and removal of microorganisms, since they are in many cases mechanically stable even in the presence of water.

The preparation of sulfonated polyaryl ether ketones is described in EP-A-08895 and EP-A-041780. According to EP-A-8895 the polymer to be sulfonated is suspended at room temperature in 98% by weight sulfuric acid. The dissolution process and the sulfonation proceed simultaneously, a very viscous solution gradually being obtained. This solution is either left as it is or is diluted at the same temperature with sulfuric acid of the same concentration. The reaction proceeds very slowly. According to the authors, it took 10 weeks for about 90% of the sulfonable phenylene units to be sulfonated. The numerical ratio of ether bridges to CO bridges was about 2:1 in the ether ketones used.

According to the process described in EP-A-41780 aromatic polyether ketones—actually copolymers—are sulfonated at elevated temperature. Only some of the monomer units (A) undergo sulfonation, whereas the monomer units (B) are not sulfonated at all. The degree of sulfonation can be controlled by the ratio of A to B. However, in this case too the reaction conditions remain unchanged during the dissolution process and thereafter. Corresponding homopolymers (A) would be sulfonated to too high a degree under the specified conditions and would thus yield water-soluble compounds. Since in this case the sulfonation takes place during the polymer dissolution process, it is difficult to control the degree of sulfonation and obtain only slightly sulfonated products.

Since in the aforedescribed processes the reaction conditions practically do not change during the course of the reaction, a considerable proportion of the sulfonic acid groups is introduced even during the dissolution process. The disadvantage of these sulfonation processes is that under mild conditions the reaction proceeds very slowly, and under vigorous conditions sulfonated products are difficult to obtain pure. The use of concentrated sulfuric acid as sulfonating agent and solvent has the disadvantage that decomposition reactions and/or crosslinking reactions occur during the treatment of the polyether ketones (cf. EP 08 895).

It is very important to monitor the degree of sulfonation of the polyether ketones during the process. The isolation of the products from the aqueous working-up medium becomes increasingly difficult with increasing degree of sulfonation. Depending on the polymer structure, the sulfonated products form in water, starting at a certain degree of sulfonation, highly swollen gels or emulsionlike precipitates that are unsuitable for example for producing membranes.

Marvel et al. (Journal of Polymer Science, Polymer Chem. Edition, Vol. 23, 2205–2223, (1985)) report the sulfonation of polyether ketones of various ether/ketone sequences using chlorosulfonic acid or an $SO_3/$-triethyl phosphate complex. With the last-mentioned system a high degree of crosslinking as well as decomposition of the polymer main chain was observed. By contrast, the chlorosulfonic acid route was more successful, though here too the decomposition of the polymer main chain was a significant secondary reaction. Studies by Bishop et al., Macromolecules, 18, 86–93 (1985) likewise found crosslinking reactions to occur in the sulfonation of polyether ketones using chlorosulfonic acid.

It is an object of the present invention to provide a process that permits a rapid and mild sulfonation of aromatic polyether ketones. It is also an object of the present invention to obtain novel sulfonated polyether ketones by means of this process.

We have found that this object is achieved by a process whereby aromatic polyether ketones of the formula I

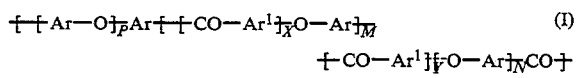

where
Ar is a phenylene ring with para and/or meta bonds,
Ar' is a phenylene, naphthylene, biphenylylene, anthrylene or another divalent aromatic unit,
X, M and N are, independently of one another, nought or 1,
Y is nought, 1, 2 or 3,
p is 1, 2, 3 or 4,
can be sulfonated. This process comprises dissolving the aromatic polyether ketone in sulfuric acid of 94 to 97% by weight concentration, adding a sulfonating agent to the resultant solution until the sulfuric acid concentration is 98 to 99.5% by weight, and working up the reaction mixture as soon as the desired degree of sulfonation is reached.

The aromatic polyether ketones of the formula I are easily accessible. The polymeric aromatic ether ketones used for the sulfonation can in principle be obtained by a Friedel-Crafts electrophilic polycondensation, in which case an appropriate aromatic bisacid dihalide is reacted with an aromatic ether. This possibility is described for example in U.S. Pat. No. 3,065,205, GB 971 227, U.S. Pat. No. 3,441,538, GB 1 387 303, WO84-03 891, and the paper by Iwakura, Y., Uno, K. and Tahiguchi, T. J., Polym. Sci., Pat. A-1, 6, 3345 (1968).

The ether ketones can also be obtained by nucleophilic aromatic substitution. For this purpose a corresponding aromatic bisdiol is reacted with an aromatic dihalogenated ketone, as described for example in: R. A., Clendinning, A. G. Farnham, W. F. Hall, R. N. Johnson and C. N. Merriam, J. Polym. Sci. A1 5, 2375, (1967), GB 1 177 183, GB 1 141 421, EP 0 001 879, U.S. Pat. Nos. 4,108,837, 4,175,175, T. E. Artwood, A. B. Newton, J. B. Rose, Br. Polym. Journ., 4, 391, (1972); T. E. Artwood, P. C. Dawson. J. L. Freemann, L. R. J. Hoy, J. B. Rose, P. A. Staniland, Polymer, 22, 1096, (1981).

The polymer with $p=1$, $X=0$, $M=1$, $Y=0$, $N=0$ is commercially available under the tradename ®Victrex. Polymers in which $N=1$ or $Y=3$ or $p=4$ or $X=1$ are preferably preparable by a nucleophilic process. The aromatic polyether ketones are preferably dissolved in sulfuric acid under mild conditions, i.e. under conditions in which sulfonation is largely suppressed or does not yet take place. Details of the degree of sulfonation in the sulfonation of the homopolymer of the formula IV under various dissolution conditions are given in the article by X. Jin, M. T. Bishop, T. S. Ellis and F.

E. Karasz, British Polymer Journal, Vol. 17, (1985), p. 4–10.

According to these authors, a degree of sulfonation of 4% was found after 3.75 hours at 25° C. in 94% strength sulfuric acid. According to our own investigations a degree of sulfonation of 25% is observed after 30 hours at 25° C. in 95% strength sulfuric acid and a degree of sulfonation of 32% after 24 hours in 96.2% strength sulfuric acid. Preferred dissolution conditions for these polymers are conditions leading to a maximum degree of sulfonation of 35%.

For the homopolymer of the formula VI, according to our own investigations a degree of sulfonation of 14% is observed after 5 hours at 25° C. in 95% strength or 96.2% strength sulfuric acid. The concentration of the sulfuric acid is thus of minor importance in this case. Preferred dissolution conditions for this polymer are conditions resulting in a maximum degree of sulfonation of 15%.

Preferably all divalent aromatic radicals Ar of the polymer to be sulfonated are phenylene radicals, preferably 1,4-phenylene radicals. The preferred sulfonating agent, which serves to increase the sulfuric acid concentration and for the sulfonation, is fuming sulfuric acid, chlorosulfonic acid or sulfur trioxide.

The concentration of the sulfuric acid used for the dissolution is preferably 96 to 96.5%. The dissolution temperature depends on the numerical ratio of ether bridges to carbonyl bridges. With an increasing proportion of ether groups relative to the carbonyl groups, the reactivity of the polyether ketone main chain for an electrophilic substitution (e.g. sulfonation) increases. The number of sulfonic acid groups that can be introduced depends on the number of aromatic rings bridged by oxygen atoms. Only O-phenyl-O units are sulfonated under the specified conditions, whereas O-phenyl-CO groups remain unsulfonated. The temperature during the dissolution of the polymer is generally from 10° to 60° C., in particular from 20° to 60° C., and preferably from 30° to 50° C. A sulfonation of the main chain is largely suppressed during this dissolution process. Our own NMR investigations have show that no decomposition occurs during the sulfonation.

After the specimen has completely dissolved, the sulfuric acid concentration is raised, e.g. by adding oleum, until the $H_2SO_4$ concentration is from 98 to 99.9% by weight, in particular from 98 to 99.5% by weight, preferably from 98.2 to 99.5% by weight. The reaction temperature in the actual sulfonation may be higher than in the dissolution process. Sulfonation is generally carried out at from 10° to 100° C., in particular from 30° to 90° C., preferably from 30° to 80° C. Both raising the temperature and prolonging the reaction time increase the degree of sulfonation of the polymer. Typical reaction times are from 0.5 to 10 hours, in particular from 1 to 8 hours, preferably from 1.5 to 3 hours. Reaction times of more than 10 hours increase the degree of sulfonation only slightly. Raising the temperature of the solution to at least 50° C. after adding the sulfonating agent accelerates the sulfonation considerably.

Preferably, homopolymers of the formulae IV, V or VI are sulfonated. According to a further refinement of the invention the described process is used to sulfonate an aromatic polyether ketone that is a copolymer and is built up from at least two different units of the formulae IV, V and VI

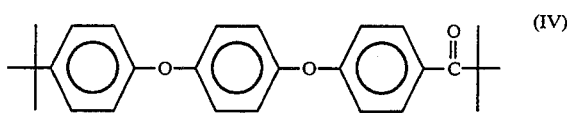

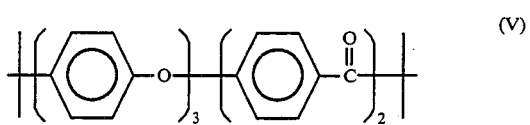

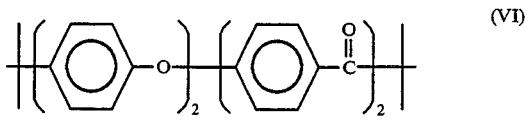

A further preferred embodiment of the process according to the invention is to use a polyether ketone that is built up from units of the formulae V or VI and in addition from non-sulfonable units. The sulfonation of copolymers of monomer units of the formula IV and non-sulfonable ether ketone units is described in EP-A-41780 and EP 08895. Complete sulfonation of a homopolymer of the formula IV would under the same conditions give a fully water-soluble product having a very high swellability in water at room temperature, which would be extremely difficult to isolate. These properties are undesirable if for example the polysulfonic acids are to be used as hydrophilic ion exchange membranes in electrolysis cells, since a high degree of swelling leads to loss of mechanical strength of the membrane. On the other hand a high degree of sulfonation is required in particular for a high ion exchanger capacity.

In this process too the polyether ketone is dissolved in 94 to 97% by weight sulfuric acid. A sulfonating agent is added to the solution until the sulfuric acid concentration is from 98 to 99.5% by weight. The reaction mixture is worked up as soon as the desired degree of sulfonation is achieved.

The non-sulfonable units preferably have the formula VII

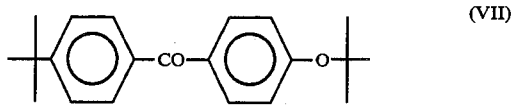

in which case they are formally derived from 4-hydroxybenzophenone, or they have the formula VIII

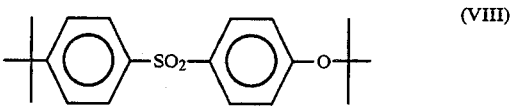

in which case they are derived from 4-hydrophenyl sulfone.

The polymer of the formula IV is dissolved in 95 to 96.5% by weight sulfuric acid at a maximum temperature of 25° C. The dissolution of the polymer of the formula V in 94 to 96% by weight sulfuric acid is preferably carried out at 30° C. The homopolymer of the formula VI is preferably dissolved in 95 to 96.5% by weight sulfuric acid at from 25° to 50° C. and is then sulfonated at temperatures of from 60° to 90° C. The polymers of the formula I are dissolved at 25° C. The actual sulfonation then takes place at at least 50° C. and at an acid concentration of at least 98.5% by weight H₂SO₄.

The aromatic polyaryl ether ketones obtained by the process according to the invention are in some cases novel. They have the formula I, at least 20% of the O-phenylene-O units (At) however being substituted by a SO₃H group. The combinations p=2, M=0, N=0, Y=0 and also p=1, M=1, X=0, Y=0, N=0 should be excluded.

In the sulfonation of the homopolymer of the formula VI, the sulfonic acid of the formula II is formed

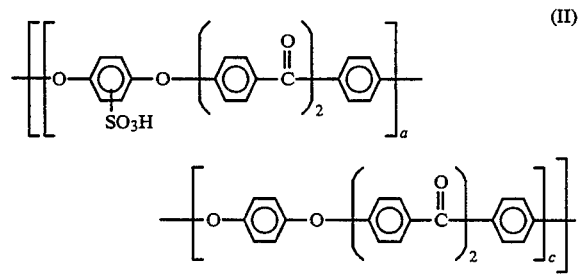

in which a is a number from 0.2 to 1, c is a number from 0 to 0.8, and the sum a+c=1.

In the sulfonation of the homopolymer of the formula V, the sulfonic acid of the formula III is formed

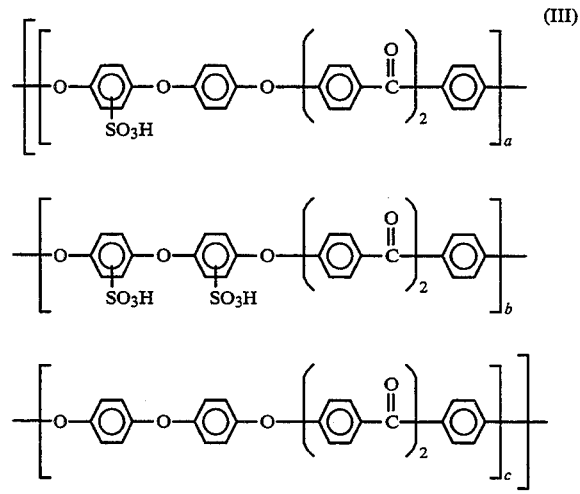

in which a is a number from 0 to 1, b is a number from 0 to 1, c is a number from 0 to 0.5, and the sum a+b+c=1.

In the sulfonation monosubstitution products (b=0) are first of all obtained, in which a is from 0.5 to 1 and c is from 0 to 0.5; a then reaches a maximum (about 1), b remaining small and c decreasing. Finally, disulfonation occurs and the value of b increases at the expense of a.

The molecular weight of the recurring unit rises with an increase in the ether/ketone ratio. The proportion of SO₃H⁻ in the total weight of the polymers IV, V and VI thus differs with the same degree of sulfonation. For example, a sulfonated polyether ketone of the formula IV having a degree of sulfonation of 40% has an SO₃H equivalent of 1.25 mmol/g, whereas a sulfonated polyether ketone of the formula VI has an SO₃H equivalent of only 0.94 mmol/g at a degree of sulfonation of 40%.

Although the degree of sulfonation (proportion of sulfonated O-phenyl-O units) is the same in both cases, the physical and mechanical properties are different. By varying the ketone proportion in the polymer, in addition to a lower reactivity a desired property profile can also be more selectively established. The polyether ketone of the formula VI can be sulfonated to extremely high levels without ever becoming water-soluble. At a degree of sulfonation of 85% the polymer of the formula IV is completely water-soluble, whereas a sulfonated polymer of the formula VI with 85% SO₃H groups can still be handled and isolated from water.

At the same degree of sulfonation a sulfonated polymer of the formula I with p=2 is less soluble and less swellable in water than a sulfonated polymer of the formula IV

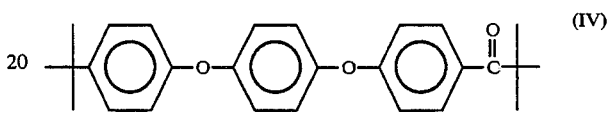

The sulfonic acids of the formula II, which are derived from the homopolymer of the formula VI, are soluble in DMF, N-methylpyrrolidone, dimethyl sulfoxide and concentrated sulfuric acid above a degree of sulfonation of 40%. They are however insoluble in 25% potassium hydroxide, chloroform and tetrahydrofuran. The ether ketones employed and also the sulfonic acids obtained have molecular weights of at least 30,000.

The invention is illustrated in more detail by the examples.

EXAMPLES:

96% strength concentrated sulfuric acid was added to a four-necked stirred apparatus provided with a dropping funnel and oil bath, and various aromatic polyether ketones were dissolved. The acid concentration was then adjusted to 98.5 to 99.5% by weight H₂SO₄ by titration with oleum (containing 20% SO₃). The sulfonation is accelerated by then raising the temperature. The final temperature depends on the respective polymer.

The experiments of Table 1 were carried out with a homopolymer of the formula IV. The experiments of Table 2 were carried out with a homopolymer of the formula V. The experiments of Table 3 were carried out with a homopolymer of the formula VI.

The following abbreviations are used in the tables:

Legend

DT = dissolution temperature
R temp. = reaction temperature
RT = reaction time
Y = yield
inh. V. = inherent viscosity measured in concentrated H₂SO₄ at 25° C. (0.1%)
Dg. sulf. = degree of sulfonation, measured by the sulfur content obtained from elementary analysis (proportion of sulfonated O-phenylene-O units)

TABLE 1

| | DT (°C.) | Acid final conc. (%) | R temp. (°C.) | RT (h) | Y (%) | inh. V (dl/g) | Dg. sulf. (%) |
|---|---|---|---|---|---|---|---|
| I | 25 | 98.50 | 25 | 1.00 | >90 | — | 40 |
| II | 25 | 98.50 | 45–50 | 1.25 | >90 | — | 63 |
| III | 25 | 98.50 | 45–50 | 1.50 | >90 | 0.73 | 66 |

TABLE 1-continued

|  | DT (°C.) | Acid final conc. (%) | R temp. (°C.) | RT (h) | Y (%) | inh. V (dl/g) | Dg. sulf. (%) |
|---|---|---|---|---|---|---|---|
| IV | 40 | 98.50 | 60 | 3.00 | >90 | 0.64 | 82 |
| V | 25 | 98.50 | 50 | 1.50 | >90 | 0.71 | 77 |
| VI | 25 | 98.50 | 50 | 1.50 | >90 | 0.71 | 76 |

TABLE 2

|  | DT (°C.) | Acid final conc. (%) | R temp. (°C.) | RT (h) | Y (%) | inh. V (dl/g) | Dg. sulf. (%) |
|---|---|---|---|---|---|---|---|
| I | 30 | 98.50 | 30–35 | 1.25 | >90 | 0.77 | 50 |
| II | 30 | 98.50 | 25–30 | 6.00 | >90 | 0.74 | 60 |
| III | 30 | 98.50 | 50 | 1.00 | >90 | 0.76 | 46 |
| IV | 30 | 98.20 | 50 | 4.00 | >90 | 0.67 | 69 |

TABLE 3

|  | DT (°C.) | Acid final conc. (%) | R temp. (°C.) | RT (h) | Y (%) | inh. V (dl/g) | Dg. sulf. (%) |
|---|---|---|---|---|---|---|---|
| I | 45 | 98.30 | 60 | 1.00 | >90 | 0.80 | 21 |
| II | 45 | 98.30 | 70 | 0.50 | >90 | 0.80 | 31 |
| III | 45 | 98.30 | 80 | 0.50 | >90 | 0.71 | 52 |
| IV | 45 | 98.30 | 80 | 1.50 | >90 | 0.67 | 72 |
| V | 45 | 98.50 | 60 | 4.00 | >90 | 0.80 | 28 |
| VI | 45 | 99.10 | 80 | 4.00 | >90 | 0.60 | 81 |
| VII | 45 | 99.95 | 60 | 4.00 | >90 | 0.69 | 82 |
| VIII | 45 | 99.95 | 80 | 6.00 | >90 | 0.57 | 75 |
| IX | 45 | 98.40 | 80 | 3.00 | >90 | 0.70 | 91 |
| X | 45 | 99.10 | 60 | 1.00 | >90 | 0.62 | 76 |
| XI | 45 | 99.95 | 60 | 0.83 | >90 | 0.70 | 57 |

What is claimed is:

1. A polymer electrolyte comprising a sulfonated aromatic polyether ketone of the formula I $$\mathrm{+[+Ar-O+_{P}Ar+]+CO-Ar^{1}+_{X}O-Ar+_{M}} \atop \mathrm{+CO-Ar^{1}+_{Y}O-Ar+_{N}CO+]} \quad (I)$$

in which at least 20% of the O-phenylene-O units have been substituted by a $SO_3H$ group, where
Ar is a phenylene ring with para and/or meta bonds,
Ar' is a phenylene, naphthylene, biphenylylene, anthrylene or another divalent aromatic unit,
X, M and N are, independently of one another, nought or 1,
Y is nought, 1, 2 or 3,
P is 1, 2, 3 or 4,
the combinations P=2, M=0, N=0, Y=0 and P=1, M=1, X=0, Y=0, N=0 being excluded.

2. A polymer electrolyte as claimed in claim 1, conforming to the formula II $$\text{(II)}$$

where
a is from 0.2 to 1,
c is from 0 to 0.8, and
a+c=1.

3. A polymer electrolyte as claimed in claim 1, conforming to the formula III $$\text{(II)}$$

where
a is from 0 to 1,
b is from 0 to 1,
c is from 0 to 0.5, and
a+b+c=1.

4. A process for preparing a polymer electrolyte by sulfonating an aromatic polyether ketone of the formula I $$\mathrm{+[+Ar-O+_{P}Ar+]+CO-Ar^{1}+_{X}O-Ar+_{M}} \atop \mathrm{+CO-Ar^{1}+_{Y}O-Ar+_{N}CO+]} \quad (I)$$

where P, X, M, Y, N, Ar and Ar' have the meanings given in claim 1, which comprises dissolving the polyether ketone in 94 to 97% by weight sulfuric acid, adding a sulfonating agent to the solution obtained until the sulfuric acid concentration is from 98 to 99.9% by weight, and working up the reaction mixture as soon as the desired degree of sulfonation is reached.

5. The process as claimed in claim 4, wherein in the formula I the radical Ar' is exclusively phenylene.

6. The process as claimed in claim 5, wherein an aromatic polyether ketone is used that is a copolymer that is built up from at least two different units of the formulae IV, V and VI $$\text{(IV)}$$

$$\text{(V)}$$

$$\text{(VI)}$$

7. A process for preparing a polymer electrolyte by sulfonating an aromatic polyether ketone in sulfuric acid, which comprises using a polyether ketone that is built up from units of the formulae

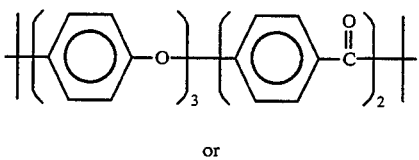

or

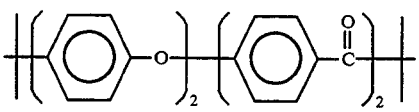

and also from non-sulfonable units, dissolving the polyether ketone in 94 to 97% by weight sulfuric acid and adding a sulfonating agent to the solution until the sulfuric acid concentration is from 98 to 99.5% by weight, and working up the reaction mixture as soon as the desired degree of sulfonation is reached.

8. The process as claimed in claim 7, wherein an aromatic polyether ketone is used whose non-sulfonable units have the formula VII

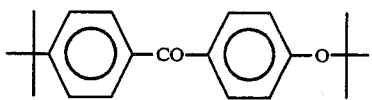

9. The process as claimed in claim 7, wherein an aromatic polyether ketone is used whose non-sulfonable units have the formula VIII

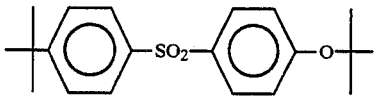

10. The process as claimed in claim 4, wherein the sulfonating agent is chosen from fuming sulfuric acid, chlorosulfonic acid or sulfur trioxide.

11. The process as claimed in claim 4, wherein the temperature of the solution is raised to at least 50° C. after adding the sulfonating agent, in order to accelerate the sulfonation.

12. The process as claimed in claim 4, wherein a polymer of the formula IV

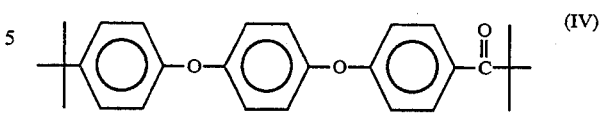

is dissolved in 95 to 96.5% by weight sulfuric acid at a maximum temperature of 25° C.

13. The process as claimed in claim 4, wherein a polymer of the formula V

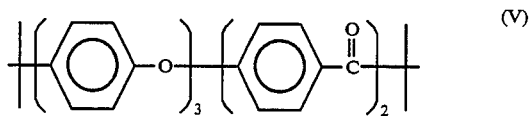

is dissolved in 94 to 96% by weight sulfuric acid at 25° C.

14. The process as claimed in claim 4, wherein a polymer of the formula VI

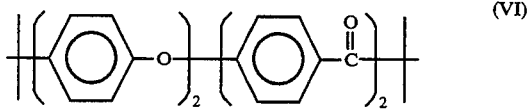

is dissolved in 95 to 96.5% by weight sulfuric acid at temperatures of from 25° to 50° C. and is sulfonated at temperatures of from 60° to 90° C.

15. The process as claimed in claim 7, wherein the sulfonating agent is chosen from fuming sulfuric acid, chlorosulfonic acid or sulfurtrioxide.

16. The process as claimed in claim 7, wherein the temperature of the solution is raised to at least 50° C. after adding the sulfonating agent, in order to accelerate the sulfonation.

17. A polymer electrolyte as claimed in claim 1, where Ar' is selected from the group consisting of phenylene, naphthylene, biphenylylene and anthrylene.

18. The process as claimed in claim 4, wherein Ar' is selected from the group consisting of phenylene, naphthylene, biphenylylene and anthrylene.

19. The process as claimed in claim 4, wherein the sulfonating agent is oleum.

* * * * *